(12) United States Patent
Ishizaka et al.

(10) Patent No.: US 8,902,513 B2
(45) Date of Patent: Dec. 2, 2014

(54) ULTRACOMPACT IMAGE PICKUP LENS

(71) Applicant: Kantatsu Co., Ltd., Yaita-shi, Tochigi (JP)

(72) Inventors: Tohru Ishizaka, Sukagawa (JP); Masaya Hashimoto, Sukagawa (JP)

(73) Assignee: Kantatsu Co., Ltd., Yaita-shi (JP)

( * ) Notice: Subject to any disclaimer, the term of this patent is extended or adjusted under 35 U.S.C. 154(b) by 0 days.

(21) Appl. No.: 13/960,980

(22) Filed: Aug. 7, 2013

(65) Prior Publication Data

US 2014/0063623 A1    Mar. 6, 2014

(30) Foreign Application Priority Data

Aug. 28, 2012    (JP) ................ 2012-187351

(51) Int. Cl.
| | |
|---|---|
| *G02B 3/02* | (2006.01) |
| *H04N 5/225* | (2006.01) |
| *G02B 9/12* | (2006.01) |
| *G02B 3/04* | (2006.01) |
| *G02B 13/00* | (2006.01) |

(52) U.S. Cl.
CPC .............. *G02B 3/04* (2013.01); *G02B 13/0035* (2013.01)
USPC ............................ 359/716; 348/340; 359/791

(58) Field of Classification Search
CPC ............................... G02B 3/04; G02B 13/0035
USPC .................................. 348/340; 359/716, 791
See application file for complete search history.

(56) References Cited

U.S. PATENT DOCUMENTS

| | | | | |
|---|---|---|---|---|
| 7,099,092 | B2* | 8/2006 | Sato ............................ | 359/791 |
| 7,180,687 | B2* | 2/2007 | Sato ............................ | 359/791 |
| 7,295,384 | B1* | 11/2007 | Sato et al. .................... | 359/716 |
| 7,599,131 | B2* | 10/2009 | Taniyama .................... | 359/784 |
| 8,558,939 | B2* | 10/2013 | Matsui et al. ................ | 348/340 |
| 2009/0195892 | A1* | 8/2009 | Lee ............................. | 359/791 |

FOREIGN PATENT DOCUMENTS

| | | |
|---|---|---|
| JP | 2004-252312 A | 9/2004 |
| JP | 2007-206611 A | 8/2007 |
| JP | 2008-276200 A | 11/2008 |

* cited by examiner

*Primary Examiner* — David N Spector
(74) *Attorney, Agent, or Firm* — Westerman, Hattori, Daniels & Adrian, LLP

(57) ABSTRACT

An image pickup lens includes, an aperture stop, a first meniscus lens having positive refractive power with a convex surface facing the object, a second lens having positive refractive power with a concave surface facing the object, a third lens having negative refractive power with a convex surface facing the object, the both surfaces of the third lens are aspheric and having at least one pole-change point, and following conditional expressions are satisfied:

$TTL<3.0$ (1)

$0.80<f1/f<0.93$ (2)

$0.35<bf/TTL<0.42$ (3)

$0.70<TTL/(2IH)<0.85$ (4)

where TTL: a length from the surface closest to the object to an image plane, f: a focal length of an overall optical system, f1: a focal length of the first lens, bf: a length from the image-side surface of the third lens to the image plane, and IH: a maximum image height.

9 Claims, 11 Drawing Sheets

ULTRACOMPACT IMAGE PICKUP LENS

The present application is based on and claims priority of Japanese patent application No. 2012-187351 filed on Aug. 28, 2012, the entire contents of which are hereby incorporated by reference.

BACKGROUND OF THE INVENTION

1. Field of the Invention

The present invention relates to an image pickup lens mounted on imaging devices adopting relatively small and thin solid-state imaging elements such as CCD sensors and C-MOS sensors disposed on portable terminals such as cellular phones and smartphones, motion sensors for home-use game machines, and PDAs (Personal Digital Assistants).

2. Description of the Related Art

Recently, demands are increasing for further downsizing and thinning of portable terminals such as cellular phones and smartphones, or devices such as PDAs, and along therewith, there are demands for improving the camera function to correspond to the increased number of pixels. Therefore, further downsizing and increase in the number of pixels is realized in imaging elements adopted in the imaging devices mounted on such devices, and in general, image pickup lenses having a high resolving power corresponding to the increased number of pixels are required. However, in image pickup lenses adopted in sub-cameras of portable terminals or the like where the users of portable terminals use the camera to take pictures of themselves from a close distance, it is required that the image pickup lenses are further downsized, thinned, and capable of taking images of objects in a wide area, in other words, that the lenses have a wide angle of field. In addition, it is required that the lenses have sufficient resolving power so that the image quality of the scenery that is taken into the images by the lenses having a wide angle of field is good. Moreover, along with the downsizing of imaging elements, the illuminance sensitivity decreases, so that it is important that the lens system has a high brightness.

Conventionally, image pickup lenses configured of four or more lenses are preferable as the image pickup lenses having high resolving power to be mounted on above-described devices, but the increase in the number of lenses is not preferable from the viewpoint of downsizing and cost reduction. Further, image pickup lenses configured of one or two lenses are advantageous from the viewpoint of downsizing and cost reduction, but various aberrations are difficult to correct via a small number of lenses, so that there is a drawback that the required resolving power cannot be acquired. Image pickup lenses having a three-lens configuration have conventionally been proposed widely as a configuration capable of solving both above-mentioned problems to a certain extent. The three-lens configuration is also suitable for corresponding to the technological advancement of imaging devices where downsizing and thinning are further advanced.

Japanese Patent Laid-Open No. 2008-276200 (Patent document 1) discloses an image pickup lens adopting a three-lens configuration having, in order from an object side, a first lens of a positive meniscus shape with a convex surface facing the object side, a second lens with a concave surface facing the object side, and a third lens having a negative refractive power near an optical axis, wherein the second lens and the third lens respectively have at least one surface thereof formed as an aspherical surface.

Further, Japanese Patent Laid-Open No. 2007-206611 (patent document 2) discloses an image pickup lens having, in order from an object side toward an image side, an aperture stop, a first lens of a positive meniscus shape with a convex surface facing the object side, a second lens having a meniscus shape with a convex surface facing the image side, and a third lens having a meniscus shape with a convex surface facing the object side, wherein the first lens, the second lens and the third lens are each formed of plastic materials, the second lens having an object side surface formed as a concave surface, the third lens having a negative refractive power near an optical axis, and the second lens and the third lens each having at least one surface thereof formed as an aspherical surface.

Even further, Japanese Patent Laid-Open No. 2004-252312 (patent document 3) discloses an image pickup lens having, in order from an object side toward an image side, a stop, a first lens with a positive refractive power, a second lens with a meniscus shape having a weak positive refractive power and having a concave surface facing the object side, and a third lens with a negative refractive power and having at least one refractive surface formed as an aspherical shape.

Patent document 1 proposes an image pickup lens having a superior productivity, a compact design and a high image forming performance. However, the total track length of the image pickup lens is approximately 4 mm, which is not sufficient from the viewpoint of responding to downsizing and thinning. Moreover, since it has an F-value as high as approximately 3.5, if the lens is adopted in downsized imaging elements, an appropriate light quantity cannot be achieved at the circumference area of the imaging elements, and it may be necessary to increase the illuminance sensitivity of the lens system when taking images. However, noise is increased when the illuminance sensitivity is set high, and the image quality is deteriorated. Further, since the half angle of field of the disclosed lens is approximately 34 degrees, it does not have a sufficiently wide angle of field.

Patent document 2 proposes an image pickup lens capable of realizing downsizing and enhanced optical performances by reducing the back focus. However, the total track length of the disclosed image pickup lens is approximately 5 mm, and it does not correspond sufficiently to downsizing and thinning. Since the disclosed image pickup lens has a short back focus, if further downsizing and thinning is required, it becomes difficult to ensure enough space required for arranging insert objects such as infrared cut filters and cover glasses. Further, since the half angle of field of the image pickup lens is approximately 32 degrees, it does not have a sufficiently wide angle of field.

Patent document 3 proposes a high resolution and compact image pickup lens realizing cost reduction while considering the assembly accuracy. In the disclosed image pickup lens, the F-value is approximately 2.4, which realizes a relatively bright lens system that can be applied to imaging elements where downsizing is advanced. However, the total track length of the image pickup lens is approximately 6 mm, which is insufficient from the viewpoint of downsizing and thinning. Moreover, according to embodiments 1 and 2, the image pickup lens is expensive, since the first lens is formed of glass material. Even further, it is difficult to fabricate a lens having an extremely small thickness using glass material, so that there is a limitation to further thinning of the lens.

SUMMARY OF THE INVENTION

In consideration of the prior art problems mentioned above, the present invention aims at providing an image pickup lens capable of favorably correcting various aberrations and ensuring sufficient back focus, realizing extreme downsizing and thinning, and having a sufficient brightness and a wide angle of field.

The image pickup lens according to the present invention is an image pickup lens for a solid-state imaging element, having, in order from an object side to an image side, an aperture stop, a first lens of a meniscus shape having a positive refractive power with a convex surface facing the object side, a second lens having a positive refractive power with a concave surface facing the object side, and a third lens having a negative refractive power with a convex surface facing the object side near an optical axis, wherein the third lens is designed so that both surfaces thereof are aspheric, having at least one pole-change point on the object side surface and the image side surface.

Further according to the above configuration, following conditional expressions (1) through (4) are satisfied:

$$TTL<3.0 \tag{1}$$

$$0.80<f1/f<0.93 \tag{2}$$

$$0.35<bf/TTL<0.42 \tag{3}$$

$$0.70<TTL/(2IH)<0.85 \tag{4}$$

where TTL represents a length along the optical axis from the surface closest to the object side to an image plane when filters and the like arranged between the third lens and the imaging elements are removed (air-converted distance), f represents a focal length of the overall optical system of the image pickup lens, f1 represents a focal length of the first lens, bf represents a length along the optical axis from the image-side surface of the third lens to the image plane when filters and the like arranged between the third lens and the imaging elements are removed (back focus (air-converted distance)), and IH represents a maximum image height.

The image pickup lens having the above configuration has two lenses out of the three lenses formed as positive lenses, so that the total track length can be reduced easily, and the single negative lens facilitates preferable correction of chromatic aberration and ensuring of appropriate back focus. Further, since the first lens has a meniscus shape with a convex surface facing the object side and the second lens has a meniscus shape with a positive refractive power and having a concave surface facing the object side, that is, the first and second lenses have symmetric surface shapes, various aberrations such as axial and off-axial spherical aberration, coma aberration and field curvature can be corrected favorably. Further, by arranging the aperture stop at a surface apex position of the object side surface of the first lens, or between the surface apex position of the object side surface of the first lens and the terminal end position of the object side surface of the first lens, it becomes possible to ensure telecentric properties while shortening the total track length. Moreover, by forming both surfaces of the third lens as aspheric and having at least one pole-change point on the object side surface and the image side surface, it becomes possible to preferably suppress the angle of rays being incident on the imaging elements while enabling preferably correct distortion, field curvature and coma aberration mainly in a high image height.

The term pole-change point according to the present invention refers to the point on an aspherical surface where a tangent plane crosses an optical axis perpendicularly.

Conditional expression (1) defines a distance on the optical axis from the surface of the image pickup lens closest to the object side to the image plane (air-converted distance), that is, the maximum value of the total track length. As long as the total track length does not exceed the upper limit of conditional expression (1), the lens can be applied preferably to devices where downsizing and thinning is advanced.

Conditional expression (2) defines the ratio of the focal length of the first lens to the focal length of the overall image pickup lens system to an appropriate range, which is a condition for ensuring an appropriate back focus, reducing the total track length and enabling preferable correction of spherical aberration and coma aberration. If the value exceeds an upper limit of conditional expression (2), the power of the first lens is relatively weakened, according to which spherical aberration and coma aberration can be corrected easily, but the back focus becomes too long, so the shortening of the total track length becomes difficult. On the other hand, if the value falls below the lower limit of conditional expression (2), the power of the first lens becomes relatively strong, so that the total track length is shortened more than necessary, according to which back focus becomes difficult to ensure and preferable correction of spherical aberration and coma aberration becomes difficult to achieve.

Amore secure effect can be expected if the conditional expression (2) falls within the range of the following conditional expression (2a).

$$0.82<f1/f<0.90 \tag{2a}$$

Conditional expression (3) defines the ratio between the back focus and the total track length to an appropriate range, which is a condition for enabling three lenses to be formed with appropriate shapes within the extremely short total track length satisfying conditional expression (1), while ensuring sufficient back focus. If the value exceeds the upper limit of conditional expression (3), the back focus becomes too long, and there will not be enough space for arranging three lenses. If the lens is to be formed in that state, problems such as the lens not being able to ensure a thickness required for injection molding or the deterioration of freedom of the lens surface shape occur. On the other hand, if the value falls below the lower limit of conditional expression (3), the value of the back focus within the total track length becomes small, so that the space required for arranging three lenses can be sufficiently ensured. In such state, it becomes possible to ensure the thickness of the lens required for injection molding or the freedom of the lens surface shape, but it is not possible to ensure a sufficient back focus, so that it becomes difficult to ensure space required for arranging filters, such as an infrared cut filter or a cover glass disposed on an upper surface side of the imaging elements, between the third lens and the imaging elements. By satisfying conditional expression (3), the image pickup lens according to the present invention can be applied without any problem not only to a COB (Chip On Board) type imaging module but also to a CSP (Chip Size Package) type imaging module requiring sufficient back focus.

Conditional expression (3) can be expected to exert a more secure effect within the range of the following conditional expression (3a).

$$0.37<bf/TTL/0.40 \tag{3a}$$

Conditional expression (4) is a condition for realizing downsizing and thinning of the image pickup lens, which enables to realize an extremely small image pickup lens capable of being applied to extremely small imaging elements by satisfying conditional expressions (1), (2) and (3) at the same time. If the value exceeds the upper limit of conditional expression (4), the total track length is elongated with respect to the maximum image height, so that it is disadvantageous from the viewpoint of thinning and downsizing of the image pickup lens, and it becomes difficult to contribute to the thinning of the device mounting the lens. On the other hand, if the value falls below the lower limit of conditional expression (4), the total track length becomes too short with respect to the maximum image height, so that it becomes extremely difficult to constitute a manufacturable image pickup lens.

A more secure effect can be expected within the range of the following conditional expression (4a).

$$0.7 < TTL/(2IH) < 0.8 \quad (4a)$$

Further, it is preferable that the image pickup lens according to the present invention satisfy the following conditional expression (5).

$$0.02 < L3Rsag/bf < 0.05 \quad (5)$$

where bf represents a length along the optical axis from the image-side surface of the third lens to the image plane when filters and the like arranged between the third lens and the imaging elements are removed (back focus (air-converted distance)), and L3Rsag represents a maximum sag at a pole-change point on the image-side surface of the third lens.

Conditional expression (5) defines the ratio of the maximum sag at the pole-change point on the image-side surface of the third lens and the back focus, which is a condition for enabling downsizing and thinning of the image pickup lens and preferable correction of various aberrations. If the value exceeds the upper limit of conditional expression (5), it is advantageous from the viewpoint of preferable correction of various aberrations, but the amount of projection toward the image side of the point on the image-side surface of the third lens closest to the image plane (in other words, the pole-change point) increases. Therefore, it becomes difficult to ensure a sufficient lens-back (distance from the point of the image-side surface of the third lens closest to the image plane to the image plane) which is a space substantially capable of arranging filters within the back focus required for arranging filters. On the other hand, if the value falls below the lower limit of conditional expression (5), the lens-back can be ensured easily, but the effect of correcting aberrations via the aspherical surface shape is reduced, and the preferable correction of mainly the field curvature and the coma aberration becomes difficult. This is also not preferable since the suppression of the angle of rays being incident on the imaging elements becomes difficult. By satisfying the range defined by conditional expression (5), the lens can be applied not only to a COB (Chip On Board) type imaging module, but also to a CSP (Chip Size Package) type imaging module requiring sufficient lens-back.

A more secure effect can be expected if the conditional expression (5) falls within the range of the following conditional expression (5a):

$$0.03 < L3Rsag/bf < 0.05 \quad (5a)$$

Further, the image pickup lens according to the present invention should preferably have two pole-change points on the object side surface of the third lens.

By forming the object-side surface of the third lens to have two pole-change points, the angle of rays being incident on the imaging elements can be controlled easily, and further, the distortion, field curvature and coma aberration in a high image height can be corrected preferably.

The image pickup lens according to the present invention should preferably satisfy the following conditional expressions (6) and (7):

$$0.16 < Di < 0.30 \quad (6)$$

$$0.04 < (Di - Tei)/SDi < 0.30 \quad (7)$$

where $Di$ represents a center thickness of the i-th lens (i=1 to 3), Tei represents an edge thickness of the i-th lens (i=1 to 3), and SDi represents an effective radius of the i-th lens (i=1 to 3). Incidentally, as shown in FIG. 11, the meaning of effective radius of the lens according to the present invention is the distance perpendicularly connecting an optical axis and a point farthest from the optical axis of the upper rays passing the object-side surface and the image-side surface of each lens. Further, the meaning of edge thickness is the distance connecting a point on the image side and a point on the object side passing the position farthest from the optical axis of the upper rays passing through the respective lenses.

Conditional expression (6) defines a center thickness of each lens to a preferable range for achieving downsizing of the image pickup lens.

Further, conditional expression (7) defines the range of a ratio between the difference between the center thickness and edge thickness of each lens and the effective radius of the lens. The present invention realizes an extremely small image pickup lens, and inevitably, each lens must also be extremely thin and downsized. Generally, in injection molding of a lens using a thermoplastic material, since it is necessary to consider fluidity during molding, it is preferable to reduce the difference of thickness from the center to the edge of the lens regarding the thickness-direction dimension of the lens. Further, regarding the radial-direction dimension of the lens, it is necessary that the radial size is not increased excessively so that lack of filling of resin will not occur. The conditional expression (7) is for overcoming the above-mentioned problems regarding injection molding, wherein by setting values to fall within the defined range, it becomes possible to prevent the occurrence of negative effects on the lens surface accuracy caused by deterioration of fluidity, and to prevent the occurrence of sinking caused by uneven thickness. Therefore, even in a thin and extremely small ultracompact lens, it becomes possible to reduce the failure rate of forming and improve the mass-productivity.

The preferred embodiment of the present invention includes a thin and small lens with only a center thickness of approximately 0.18 and an edge thickness of approximately 0.15, and the forming of such ultracompact lens can be realized by setting the value of the effective diameter to fall within the defined numerical range of conditional expression (7).

In order to realize such ultracompact lens as mentioned above, it is preferable that a plastic material having high fluidity is adopted in addition to the condition of conditional expression (7). An even more stable molding is enabled by using APL5014CL manufactured by Mitsui Chemicals, Inc. as an example of cycloolefin-based plastic material, or by using EP5000 manufactured by Mitsubishi Gas Chemical Company, Inc. as an example of polycarbonate-based plastic material. These materials are suitable for forming ultracompact lenses disclosed in the present invention, since the value of melt flow rate (ISO 1133: Law 1997/JIS K7210: Law 1999, 280° C., load 2,160 g), which is an index showing the fluidity of a thermoplastic resin, is 38 g/10 min or greater, showing high fluidity.

Further, the image pickup lens according to the present invention should preferably satisfy the following conditional expression (8):

$$0.41 < (IH/f)/TTL < 0.51 \quad (8)$$

where TTL represents a length along the optical axis from the surface closest to the object side to the image plane when filters and the like arranged between the third lens and the imaging elements are removed (air-converted distance), IH represents a maximum image height, and f represents a focal length of the overall optical system of the image pickup lens.

Conditional expression (8) defines a condition for realizing downsizing and thinning while maintaining the angle of field of the image pickup lens to a preferable range. If the value exceeds the upper limit of conditional expression (8), the total track length is shortened but the angle of field becomes too broad, so that the light quantity at the circumference area tends to deteriorate. Further, since it becomes difficult to control the incident angle of main rays to the imaging elements, not only the circumference brightness but also the MTF characteristics at the circumference is deteriorated, which may cause significant deterioration of performance of the image pickup lens. On the other hand, if the value falls below the lower limit of conditional expression (8), the angle of field becomes too narrow, which is not preferable from the viewpoint of responding sufficiently to the widening of the angle of field.

Conditional expression (8) can be expected to exert a more secure effect within the range of the following conditional expression (8a).

$$0.43<(IH/f)/TTL<0.49 \qquad (8a)$$

Further, the image pickup lens according to the present invention should preferably satisfy a following conditional expression (9):

$$-0.21<f1/f23<-0.15 \qquad (9)$$

where f1 represents a focal length of the first lens, and f23 represents a composite focal length of the second lens and the third lens.

Conditional expression (9) defines the ratio between the focal length of the first length and the composite focal length of the second and third lenses to an appropriate range, which is a condition for shortening the total track length and preferably correcting spherical aberration and distortion. If the value exceeds the upper limit of conditional expression (9), the positive power of the first lens with respect to the negative composite power of the second and third lenses becomes too strong, which is advantageous from the viewpoint of reducing the total track length, but the correction of axial and off-axial chromatic aberration becomes insufficient (chromatic aberration of short wavelengths is increased in the negative direction with respect to the chromatic aberration of a reference wavelength). Further, the amount of aberration on the high image-height side of distortion is increased in the negative direction, which is not preferable since barrel-shape tendency becomes too intense. On the other hand, if the value falls below a lower limit of conditional expression (9), the positive power of the first lens with respect to the negative composite power of the second and third lenses becomes too weak, which is not preferable since the axial and off-axial chromatic aberration are corrected excessively (chromatic aberration of short wavelengths is increased in the positive direction with respect to the chromatic aberration of a reference wavelength).

Further according to the image pickup lens of the present invention, it is preferable that the following conditional expressions (10) and (11) are satisfied:

$$-5.0<f3/f<-2.0 \qquad (10)$$

$$1.6<r5/r6<2.2 \qquad (11)$$

where f represents a focal length of the overall optical system of the image pickup lens, f3 represents a focal length of the third lens, r5 represents a curvature radius of the object side surface of the third lens, and r6 represents a curvature radius of the image side surface of the third lens.

Conditional expressions (10) and (11) define the power of the third lens appropriately, which are conditions for downsizing the image pickup lens while ensuring an appropriate back focus, and suppressing chromatic aberration to fall within a preferable range. If the value exceeds the upper limits of conditional expressions (10) and (11), the negative power of the third lens becomes too strong, leading to a long back focus and a long total track length, so that it is disadvantageous from the viewpoint of downsizing the image pickup lens. On the other hand, if the value falls below the lower limit of conditional expressions (10) and (11), the negative power of the third lens becomes too weak, so that it is advantageous in shortening the total track length, but the axial and off-axial chromatic aberration becomes too excessive, so that it becomes difficult to achieve a preferable image forming performance. Further, it becomes difficult to ensure an appropriate back focus.

Further according to the image pickup lens of the present invention, the following conditional expression (12) should preferably be satisfied:

$$0.15<T1/f<0.20 \qquad (12)$$

where f represents a focal length of the overall optical system of the image pickup lens, and T1 represents an air distance on optical axis between the first lens and the second lens.

Conditional expression (12) is a condition for downsizing the image pickup lens, ensuring an appropriate back focus, and enabling preferable correction of aberration. If the value exceeds the upper limit of conditional expression (12), the power balance between the respective lenses is deteriorated, and it becomes difficult to ensure an appropriate back focus. Further, since the air distance between the first lens and the second lens becomes too broad, the total track length becomes long, which is not preferable. On the other hand, if the value falls below a lower limit of conditional expression (12), the air distance between the first lens and the second lens becomes too narrow, so that an area where low image-height rays and high image-height rays overlap may be created, and as a result, preferable correction of distortion and coma aberration becomes difficult. When the air distance between the first and second lenses becomes too narrow, the air distance at the circumference area of the first and second lenses will also be narrowed, so that the two lenses may interfere with one another, depending on the variability of fabrication tolerance. By setting the value to fall within the defined range, appropriate power can be distributed to each lens, and it becomes possible to ensure a sufficient back focus and to perform preferable correction of aberration.

Conditional expression (12) can be expected to exert a more secure effect within the range of the following conditional expression (12a).

$$0.165<T1/f<0.183 \qquad (12a)$$

Further according to the image pickup lens of the present invention, it is preferable that the following conditional expression (13) is satisfied:

$$-3.0<(r1+r2)/(r1-r2)<-2.0 \qquad (13)$$

where r1 represents a curvature radius of the object side surface of the first lens, and r2 represents a curvature radius of the image side surface of the first lens.

Conditional expression (13) shows a shape factor regarding the symmetry of the object-side surface and the image-side surface of the first lens, and defines a condition for appropriately setting the shape of the first lens. If the value exceeds the upper limit of conditional expression (13), the shapes of the object-side surface and the image-side surface of the first lens approximate symmetry, and the chromatic aberration tends to deteriorate. Since the image-side principal position of the first lens moves toward the image, it becomes difficult to reduce the total track length. On the other hand, if the value falls below the lower limit of conditional expression (13), the image-side principal position of the first lens moves toward the object side, according to which the total track length can be advantageously shortened, but the curvature radius of the object-side surface of the first lens or the curvature radius of the image-side surface of the first lens becomes too small, which is not preferable since the production error sensitivity becomes high.

Conditional expression (13) can be expected to exert a more secure effect within the range of the following conditional expression (13a).

$$-2.7<(r1+r2)/(r1-r2)<-2.4 \quad (13a)$$

DETAILED DESCRIPTION OF THE PREFERRED EMBODIMENTS

Now, preferred embodiments of the present invention will be described in detail with reference to the drawings.

FIGS. 1, 3, 5, 7 and 9, respectively, are general configuration diagrams of the image pickup lens according to Embodiments 1 through 5 of the present embodiment. The basic lens configuration is the same in all embodiments, so that an explanation is given on the image pickup lens configuration of the present embodiment with reference to the general configuration diagram of Embodiment 1.

Figure 1:
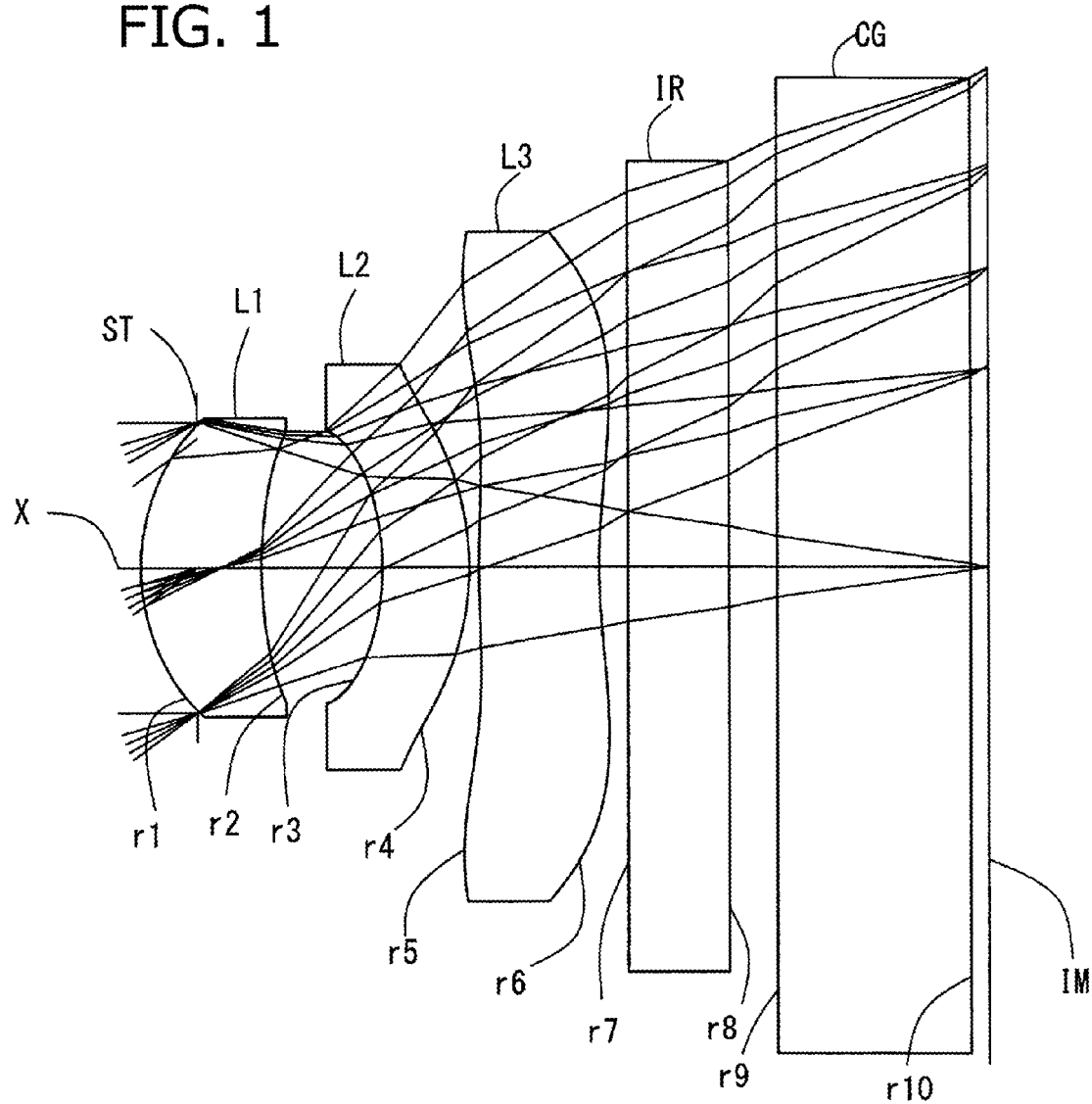
FIG. 1 is a view showing a general configuration of an image pickup lens according to Embodiment 1.

As is shown in FIG. 1, an image pickup lens of the present embodiment is composed of, in order from an object side to an image plane side, a first lens L1 having a positive refractive power, a second lens L2 having a positive refractive power, and a third lens L3 having a negative refractive power. An aperture stop ST is arranged on an object side of the first lens L1. A filter IR and a cover glass CG are arranged between the third lens L3 and an image plane IM. The filter IR and the cover glass CG can be omitted.

In the image pickup lens having the above-mentioned three-lens configuration, a first lens L1 is a meniscus lens with an object side surface r1 being a convex surface and an image side surface r2 being a concave surface, a second lens L2 is a meniscus lens with an object side surface r3 being a concave surface and an image side surface r4 being a convex surface, and a third lens L3 is a meniscus lens having both surfaces formed as aspherical surfaces with an object side surface r5 being a convex surface near the optical axis X and an image side surface r6 being a concave surface. The object side surface and the image side surface of the third lens are formed to include at least one pole-change point.

According further to the present embodiment, all the image pickup lenses are formed of plastic materials. In all the preferred embodiments, the first lens L1, the second lens L2 and the third lens L3 are formed of cycloolefin-based plastic material.

Stable mass production can be realized and cost reduction can be facilitated by adopting plastic materials for all the lenses. Further, since all lenses are formed of the same material, they can be fabricated easily.

The image pickup lens according to the present invention satisfies the following conditional expressions.

$$TTL<3.0 \quad (1)$$

$$0.80<f1/f<0.93 \quad (2)$$

$$0.35<bf/TTL<0.42 \quad (3)$$

$$0.70<TTL/(2IH)<0.85 \quad (4)$$

$$0.02<L3Rsag/bf<0.05 \quad (5)$$

$$0.16<Di<0.30 \quad (6)$$

$$0.09<(Di-Tei)/SDi<0.33 \quad (7)$$

$$0.41<(IH/f)/TTL<0.51 \quad (8)$$

$$-0.20<f1/f23<-0.15 \quad (9)$$

$$-5.0<f3/f<-2.0 \quad (10)$$

$$1.6<r5/r6<2.2 \quad (11)$$

$$0.15<T1/f<0.20 \quad (12)$$

$$-3.0<(r1+r2)/(r1-r2)<-2.0 \quad (13)$$

where
TTL: length along the optical axis from the surface closest to the object side to the image plane when filters and the like arranged between the third lens and the imaging elements are removed
f: focal length of the overall optical system of the image pickup lens
f1: focal length of the first lens
bf: length along the optical axis from the image-side surface of the third lens to the image plane when filters and the like arranged between the third lens and the imaging elements are removed (back focus (air-converted distance))

IH: maximum image height
L3Rsag: maximum sag at pole-change point on image-side surface of third lens
Di: center thickness of i-th lens (i=1 to 3)
Tei: edge thickness of i-th lens (i=1 to 3)
SDi: effective radius of i-th lens (i=1 to 3)
f23: composite focal length of the second lens and the third lens
f3: focal length of the third lens
r5: curvature radius of object side surface of the third lens
r6: curvature radius of image side surface of the third lens
T1: air distance on optical axis between the first lens and the second lens
r1: curvature radius of object side surface of the first lens
r2: curvature radius of image side surface of the first lens In the present embodiment, all lens surfaces are formed as aspherical surfaces. The aspherical shape adopted in these lens surfaces is represented by the following equation, when an axis in the optical axis direction is denoted as Z, a height in a direction orthogonal to the optical axis is denoted as H, a conic constant is denoted as k, and aspherical coefficients are denoted as A4, A6, A8, A10, A12, A14 and A16.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, preferred embodiments of the image pickup lens according to the present embodiments will be shown. In each embodiment, f represents a focal length of the overall image pickup lens system, Fno represents an F-number, ω represents a half angle of field, and IH represents a maximum image height. Further, i represents a surface number counted from the object side, r represents a curvature radius, d represents a distance between lens surfaces on the optical axis (surface distance), Nd represents a refractive index with respect to a d-ray (reference wavelength), νd represents an Abbe number with respect to the d-ray, SD represents an effective radius of the lens, and Te represents an edge thickness of the lens. Aspherical surfaces will be shown with a sign * (asterisk) after the surface number i.

Embodiment 1

Basic lens data will be shown in Table 1 below.

TABLE 1

Embodiment 1
Unit mm f = 1.431
Fno = 2.43
ω(°) = 35.74
IH = 1.028

Surface Data

| Surface No. | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.1175 | | |
| 2* | 0.440 | 0.250 | 1.5438 | 55.57 |
| 3* | 1.002 | 0.250 | | |
| 4* | −0.535 | 0.180 | 1.5438 | 55.57 |
| 5* | −0.572 | 0.020 | | |
| 6* | 2.233 | 0.250 | 1.5438 | 55.57 |
| 7* | 1.257 | 0.060 | | |
| 8 | Infinity | 0.210 | 1.5168 | 64.20 |
| 9 | Infinity | 0.100 | | |
| 10 | Infinity | 0.400 | 1.5168 | 64.20 |
| 11 | Infinity | 0.037 | | |
| Image Plane | Infinity | | | |

Aspherical Surface Data

| | 2nd Surface | 3rd Surface | 4th Surface | 5th Surface | 6th Surface | 7th Surface |
|---|---|---|---|---|---|---|
| k | −1.082E+00 | 2.009E+00 | 2.564E+00 | −1.204E+00 | 3.045E+00 | −3.849E+00 |
| A4 | 1.540E+00 | 1.331E+00 | 3.955E+00 | −7.731E−01 | −3.304E+00 | −2.202E+00 |
| A6 | 1.846E+01 | −1.325E+01 | −1.783E+02 | −5.933E−01 | 1.175E+01 | 5.552E+00 |
| A8 | −1.391E+02 | 3.885E+02 | 4.741E+03 | −6.216E+01 | −2.103E+01 | −1.297E+01 |
| A10 | 1.077E+03 | −2.456E+03 | −6.095E+04 | 1.307E+03 | 2.777E+01 | 1.872E+01 |
| A12 | 0.000E+00 | 0.000E+00 | 3.195E+05 | −4.900E+03 | −3.234E+01 | −2.197E+01 |
| A14 | 0.000E+00 | 0.000E+00 | 0.000E+00 | 3.100E+01 | 2.084E+01 | 1.776E+01 |
| A16 | 0.000E+00 | 0.000E+00 | 0.000E+00 | 0.000E+00 | 0.000E+00 | 0.000E+00 |

Single Lens Data

| Lens | Start Plane | Focal Length | Effective Radius SD | Edge Thickness Te |
|---|---|---|---|---|
| 1 | 2 | 1.242 | 0.297 | 0.177 |
| 2 | 4 | 21.750 | 0.419 | 0.153 |
| 3 | 6 | −5.791 | 0.694 | 0.174 |

The image pickup lens according to Embodiment 1 satisfies all conditional expressions (1) through (13), as shown in Table 6. Further, the first lens, the second lens and the third lens are all formed of cycloolefin copolymer, which is a plastic material having high fluidity, so that the fabrication of an ultracompact lens can be realized.

Figure 2:
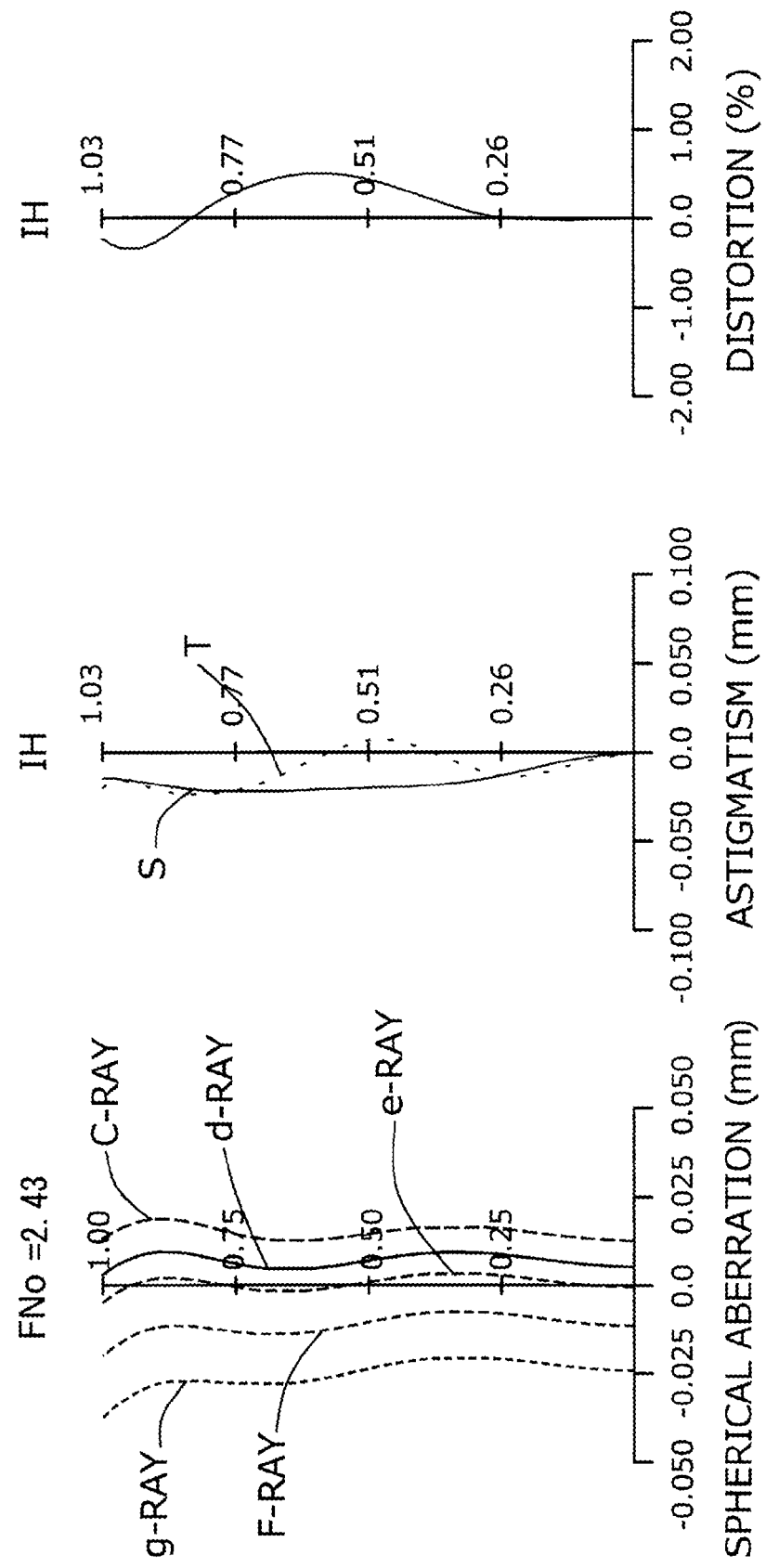
FIG. 2 is a view showing a spherical aberration, an astigmatism and a distortion of the image pickup lens according to Embodiment 1.
Figure 3:
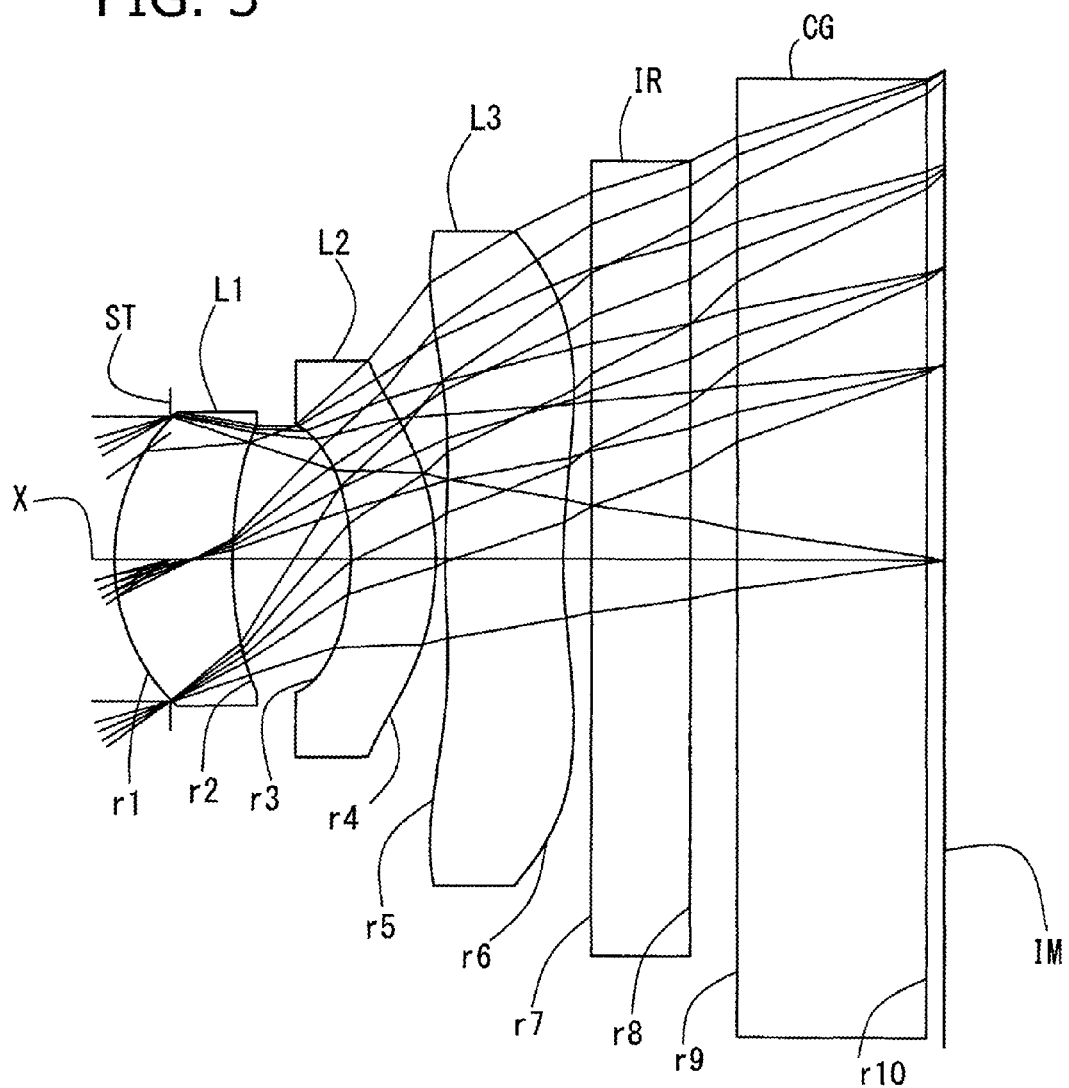
FIG. 3 is a view showing a general configuration of the image pickup lens according to Embodiment 2.

FIG. 2 shows a spherical aberration (mm), an astigmatism (mm), and a distortion (%) of the image pickup lens according to Embodiment 1. The spherical aberration diagram illustrates the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T (the same applies to FIGS. 4, 6, 8 and 10). As shown in FIG. 2, it can be seen that the respective aberrations are satisfactorily corrected.

Further, the total track length TTL is as extremely short as 1.55 mm, the ratio thereof to the maximum image height IH (TTL/2IH) is 0.75, and the back focus is 0.60 mm, which means that an extremely thin and compact image pickup lens is realized while ensuring a sufficient back focus. Further, the F-value is as bright as 2.43, and the half angle of field is approximately 35.8°, which means that a relatively wide angle of field is realized.

Embodiment 2

Basic lens data will be shown in Table 2 below.

TABLE 2

Embodiment 2
Unit mm $f = 1.435$
$Fno = 2.41$
$\omega(°) = 35.68$
$IH = 1.028$

Surface Data

| Surface No. | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.1175 | | |
| 2* | 0.440 | 0.250 | 1.5438 | 55.57 |
| 3* | 1.002 | 0.250 | | |
| 4* | −0.535 | 0.180 | 1.5438 | 55.57 |
| 5* | −0.572 | 0.020 | | |
| 6* | 2.137 | 0.250 | 1.5438 | 55.57 |
| 7* | 1.202 | 0.060 | | |
| 8 | Infinity | 0.210 | 1.5168 | 64.20 |
| 9 | Infinity | 0.100 | | |
| 10 | Infinity | 0.400 | 1.5168 | 64.20 |
| 11 | Infinity | 0.038 | | |
| Image Plane | Infinity | | | |

Aspherical Surface Data

| | 2nd Surface | 3rd Surface | 4th Surface | 5th Surface | 6th Surface | 7th Surface |
|---|---|---|---|---|---|---|
| k | −1.082E+00 | 2.009E+00 | 2.564E+00 | −1.204E+00 | 3.211E+00 | 2.336E−02 |
| A4 | 1.540E+00 | 1.331E+00 | 3.955E+00 | −7.731E−01 | −3.294E+00 | −2.420E+00 |
| A6 | 1.846E+01 | −1.325E+01 | −1.783E+02 | −5.933E−01 | 1.085E+01 | 4.969E+00 |
| A8 | −1.391E+02 | 3.885E+02 | 4.741E+03 | −6.216E+01 | −1.761E+01 | −1.177E+01 |
| A10 | 1.077E+03 | −2.456E+03 | −6.095E+04 | 1.307E+03 | 2.563E+01 | 2.157E+01 |
| A12 | 0.000E+00 | 0.000E+00 | 3.195E+05 | −4.900E+03 | −4.094E+01 | −3.313E+01 |
| A14 | 0.000E+00 | 0.000E+00 | 0.000E+00 | 3.100E+01 | 3.260E+01 | 2.739E+01 |
| A16 | 0.000E+00 | 0.000E+00 | 0.000E+00 | 0.000E+00 | 0.000E+00 | 0.000E+00 |

Single Lens Data

| Lens | Start Plane | Focal Length | Effective Radius SD | Edge Thickness Te |
|---|---|---|---|---|
| 1 | 2 | 1.242 | 0.304 | 0.171 |
| 2 | 4 | 21.750 | 0.418 | 0.153 |
| 3 | 6 | −5.559 | 0.692 | 0.176 |

The image pickup lens according to Embodiment 2 satisfies all conditional expressions (1) through (13), as shown in Table 6. Further, the first lens, the second lens and the third lens are all formed of cycloolefin copolymer, which is a plastic material having high fluidity, so that the fabrication of an ultracompact lens can be realized.

Figure 4:
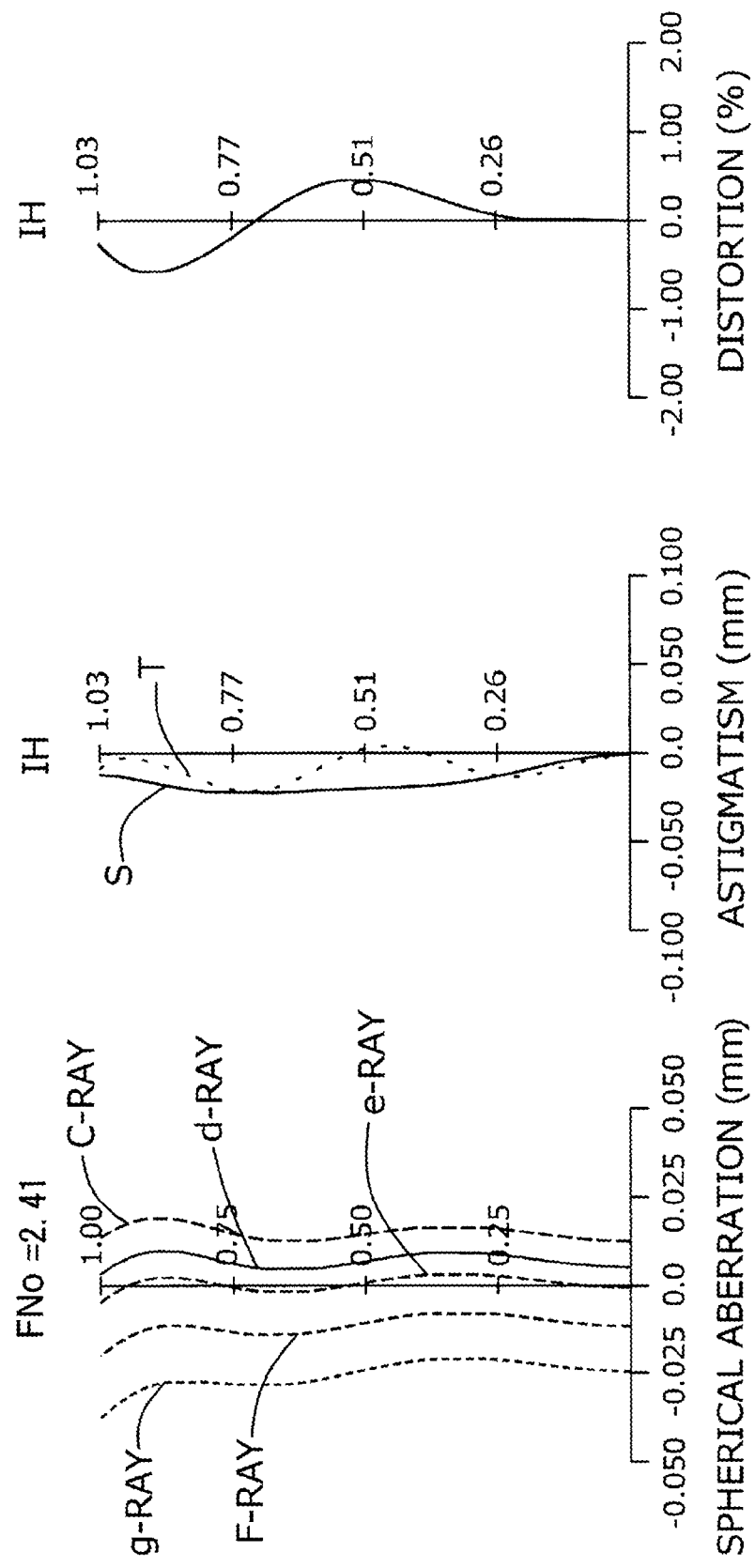
FIG. 4 is a view showing a spherical aberration, an astigmatism and a distortion of the image pickup lens according to Embodiment 2.
Figure 5:
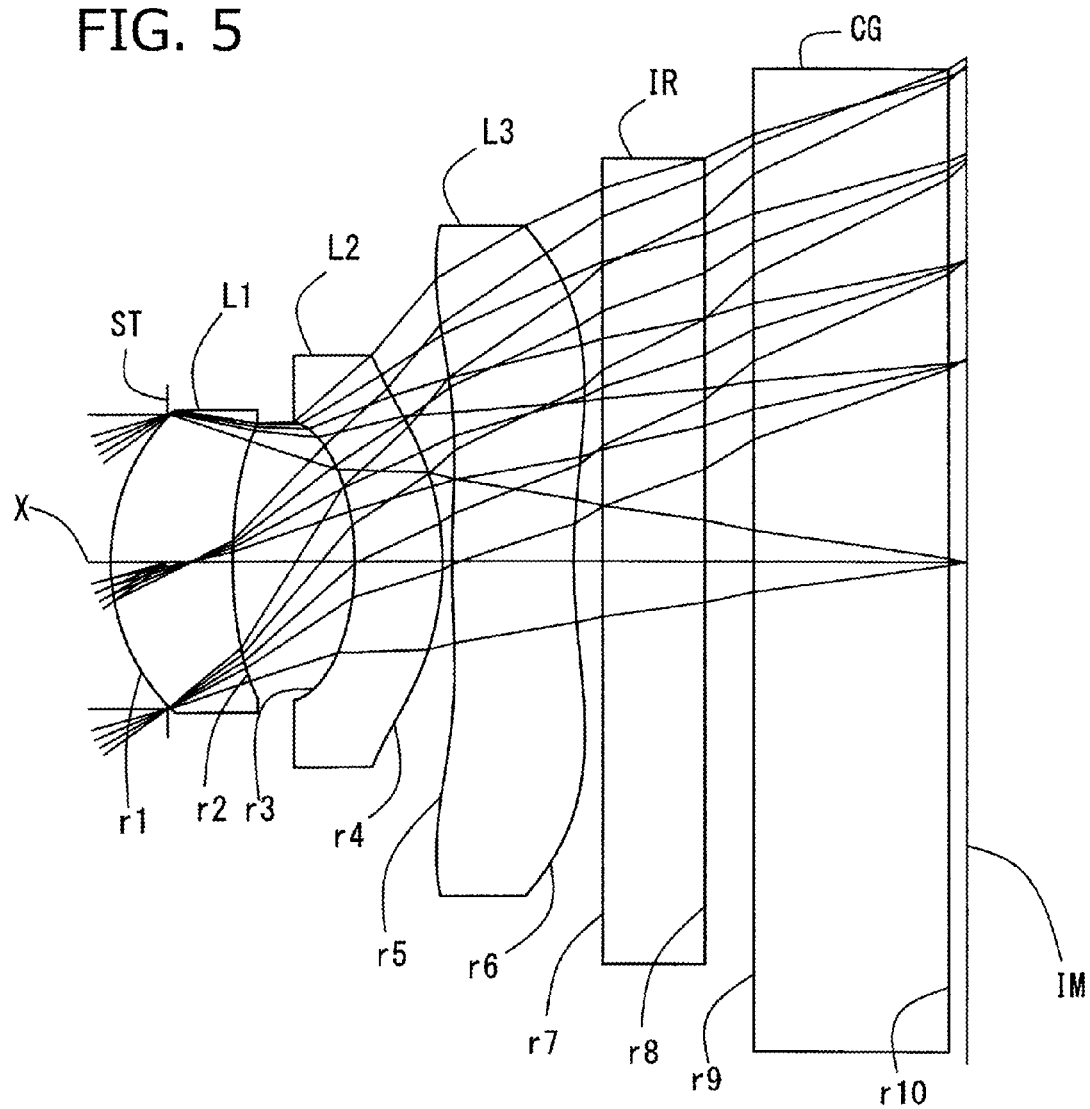
FIG. 5 is a view showing a general configuration of the image pickup lens according to Embodiment 3.

FIG. 4 shows a spherical aberration (mm), an astigmatism (mm), and a distortion (%) of the image pickup lens according to Embodiment 2. As shown in FIG. 4, it can be seen that the respective aberrations are satisfactorily corrected.

Further, the total track length TTL is as extremely short as 1.55 mm, the ratio thereof to the maximum image height IH (TTL/2IH) is 0.75, and the back focus is 0.60 mm, which means that an extremely thin and compact image pickup lens is realized while ensuring a sufficient back focus. Further, the F-value is as bright as 2.41, and the half angle of field is approximately 35.7°, which means that a relatively wide angle of field is realized.

Embodiment 3

Basic lens data will be shown in Table 3 below.

TABLE 3

Embodiment 3
Unit mm $f = 1.430$
$Fno = 2.43$
$\omega(°) = 35.69$
$IH = 1.028$

Surface Data

| Surface No | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.1175 | | |
| 2* | 0.441 | 0.248 | 1.5438 | 55.57 |
| 3* | 1.001 | 0.249 | | |
| 4* | −0.541 | 0.187 | 1.5438 | 55.57 |
| 5* | −0.544 | 0.031 | | |
| 6* | 2.538 | 0.235 | 1.5438 | 55.57 |
| 7* | 1.172 | 0.060 | | |
| 8 | Infinity | 0.21 | 1.5168 | 64.20 |
| 9 | Infinity | 0.100 | | |
| 10 | Infinity | 0.400 | 1.5168 | 64.20 |
| 11 | Infinity | 0.042 | | |
| Image Plane | Infinity | | | |

Aspherical Surface Data

| | 2nd Surface | 3rd Surface | 4th Surface | 5th Surface | 6th Surface | 7th Surface |
|---|---|---|---|---|---|---|
| k | −1.143E+00 | 2.544E+00 | 2.614E+00 | −1.189E+00 | 4.895E+00 | −4.792E+00 |
| A4 | 1.465E+00 | 1.463E+00 | 4.088E+00 | −7.883E−01 | −3.304E+00 | −2.208E+00 |
| A6 | 2.039E+01 | −1.617E+01 | −1.846E+02 | −1.360E+00 | 1.175E+01 | 5.530E+00 |
| A8 | −1.361E+02 | 3.960E+02 | 4.731E+03 | −6.435E+01 | −2.087E+01 | −1.260E+01 |
| A10 | 9.620E+02 | −2.401E+03 | −6.023E+04 | 1.375E+03 | 2.772E+01 | 1.897E+01 |
| A12 | 0.000E+00 | 0.000E+00 | 3.195E+05 | −4.955E+03 | −3.243E+01 | −2.370E+01 |
| A14 | 0.000E+00 | 0.000E+00 | 0.000E+00 | 2.709E+01 | 2.016E+01 | 1.872E+01 |
| A16 | 0.000E+00 | 0.000E+00 | 0.000E+00 | 0.000E+00 | 0.000E+00 | 0.000E+00 |

Single Lens Data

| Lens | Start Plane | Focal Length | Effective Radius SD | Edge Thickness Te |
|---|---|---|---|---|
| 1 | 2 | 1.248 | 0.297 | 0.177 |
| 2 | 4 | 8.485 | 0.413 | 0.151 |
| 3 | 6 | −4.248 | 0.692 | 0.175 |

The image pickup lens according to Embodiment 3 satisfies all conditional expressions (1) through (13), as shown in Table 6. Further, the first lens, the second lens and the third lens are all formed of cycloolefin copolymer, which is a plastic material having high fluidity, so that the fabrication of an ultracompact lens can be realized.

Figure 6:
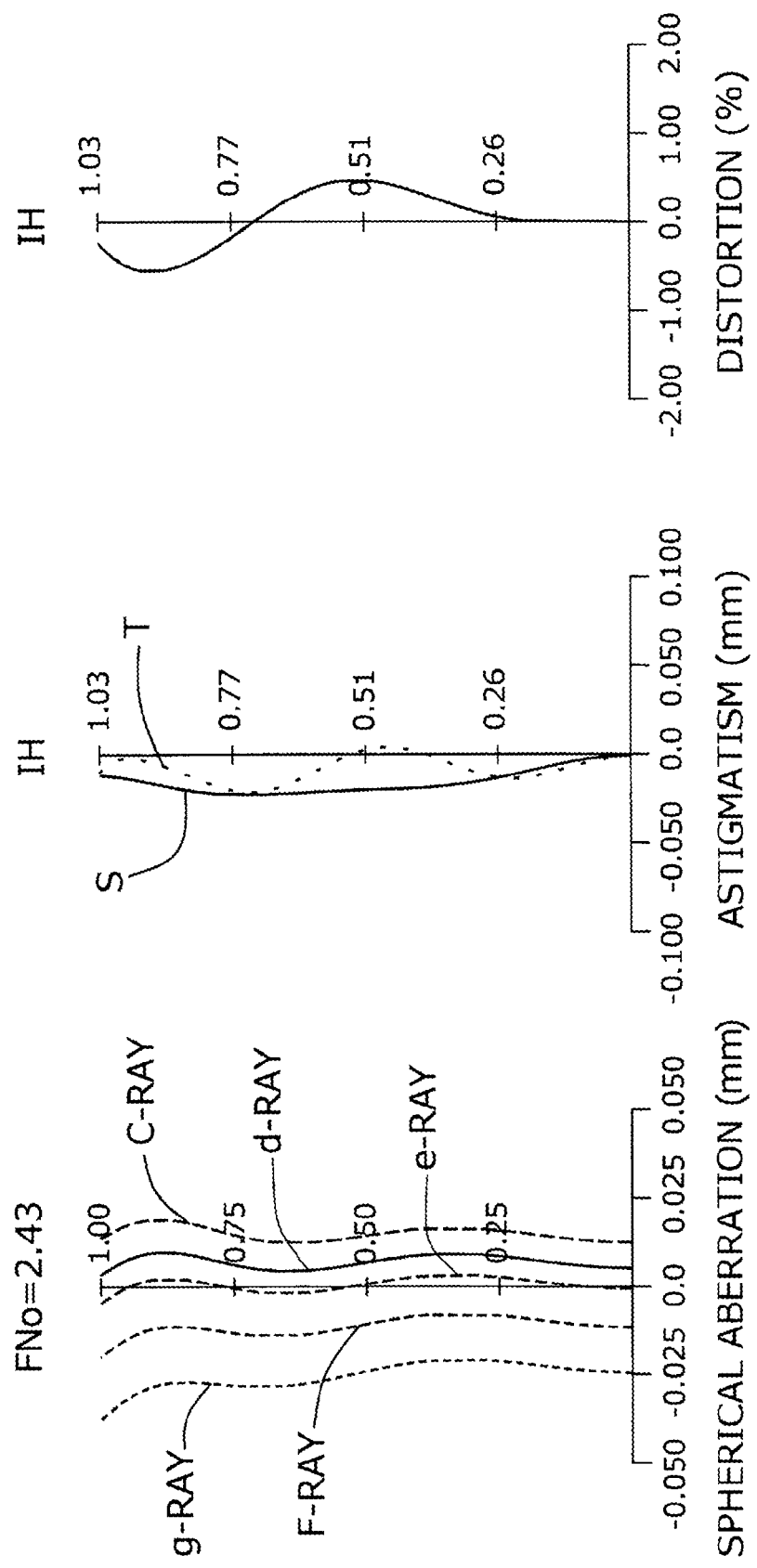
FIG. 6 is a view showing a spherical aberration, an astigmatism and a distortion of the image pickup lens according to Embodiment 3.
Figure 7:
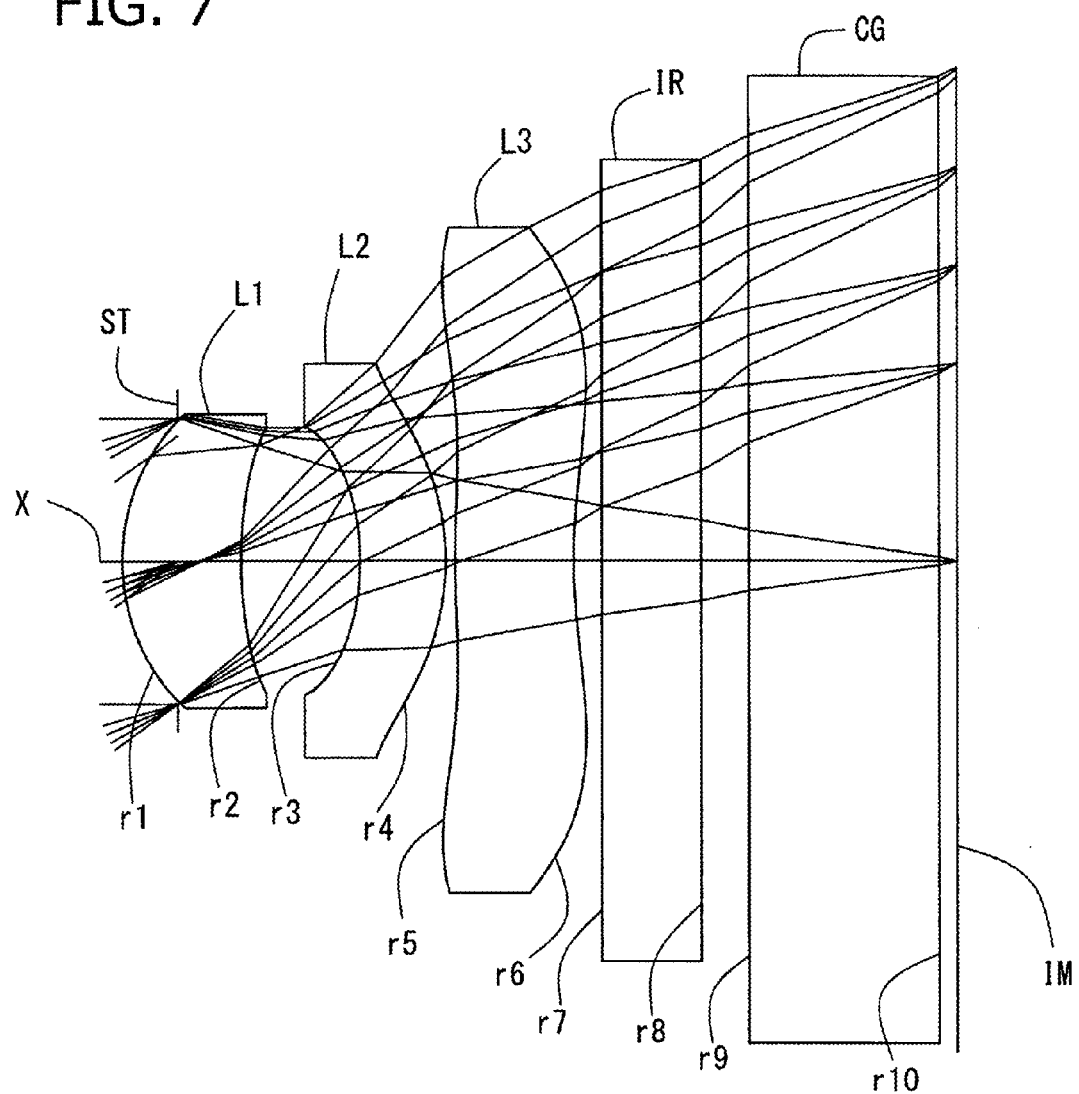
FIG. 7 is a view showing a general configuration of the image pickup lens according to Embodiment 4.

FIG. 6 shows a spherical aberration (mm), an astigmatism (mm), and a distortion (%) of the image pickup lens according to Embodiment 3. As shown in FIG. 6, it can be seen that the respective aberrations are satisfactorily corrected.

Further, the total track length TTL is as extremely short as 1.55 mm, the ratio thereof to the maximum image height IH (TTL/2IH) is 0.76, and the back focus is 0.60 mm, so that an extremely thin and compact image pickup lens is realized while ensuring a sufficient back focus. Further, the F-value is as bright as 2.43, and the half angle of field is approximately 35.7°, which means that a wide angle of field is realized.

Embodiment 4

Basic lens data will be shown in Table 4 below.

TABLE 4

Embodiment 4
Unit mm f = 1.429
Fno = 2.43
ω(°) = 35.74
IH = 1.028

Surface Data

| Surface No. | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.1175 | | |
| 2* | 0.441 | 0.250 | 1.5438 | 55.57 |
| 3* | 1.006 | 0.250 | | |
| 4* | −0.480 | 0.180 | 1.5438 | 55.57 |
| 5* | −0.483 | 0.020 | | |
| 6* | 2.211 | 0.250 | 1.5438 | 55.57 |
| 7* | 1.020 | 0.060 | | |
| 8 | Infinity | 0.21 | 1.5168 | 64.20 |
| 9 | Infinity | 0.100 | | |
| 10 | Infinity | 0.400 | 1.5168 | 64.20 |
| 11 | Infinity | 0.376 | | |
| Image Plane | Infinity | | | |

Aspherical Surface Data

| | 2nd Surface | 3rd Surface | 4th Surface | 5th Surface | 6th Surface | 7th Surface |
|---|---|---|---|---|---|---|
| k | −1.045E+00 | 2.421E+00 | 1.840E+00 | −1.210E−00 | 3.427E+00 | −3.976E−01 |
| A4 | 1.588E+00 | 1.452E+00 | 3.660E+00 | −6.623E−01 | −3.102E+00 | −2.792E+00 |
| A6 | 1.805E+01 | −1.197E+01 | −1.552E+02 | 1.400E+00 | 1.075E+01 | 6.430E+00 |
| A8 | −1.445E+02 | 2.989E+02 | 4.415E+03 | −5.140E+01 | −1.869E+01 | −1.407E+01 |
| A10 | 1.209E+03 | −1.126E+03 | −5.779E+04 | 1.216E+03 | 2.616E+01 | 2.171E+01 |
| A12 | 0.000E+00 | 0.000E+00 | 3.197E+05 | −4.089E+03 | −3.536E+01 | −2.775E+01 |
| A14 | 0.000E+00 | 0.000E+00 | 0.000E+00 | 3.414E+00 | 2.588E+01 | 2.171E+01 |
| A16 | 0.000E+00 | 0.000E+00 | 0.000E+00 | 0.000E+00 | 0.000E+00 | 0.000E+00 |

Single Lens Data

| Lens | Start Plane | Focal Length | Effective Radius SD | Edge Thickness Te |
|---|---|---|---|---|
| 1 | 2 | 1.243 | 0.303 | 0.174 |
| 2 | 4 | 7.030 | 0.405 | 0.161 |
| 3 | 6 | −3.745 | 0.675 | 0.203 |

The image pickup lens according to Embodiment 4 satisfies all conditional expressions (1) through (13), as shown in Table 6. Further, the first lens, the second lens and the third lens are all formed of cycloolefin copolymer, which is a plastic material having high fluidity, so that the fabrication of an ultracompact lens can be realized.

Figure 8:
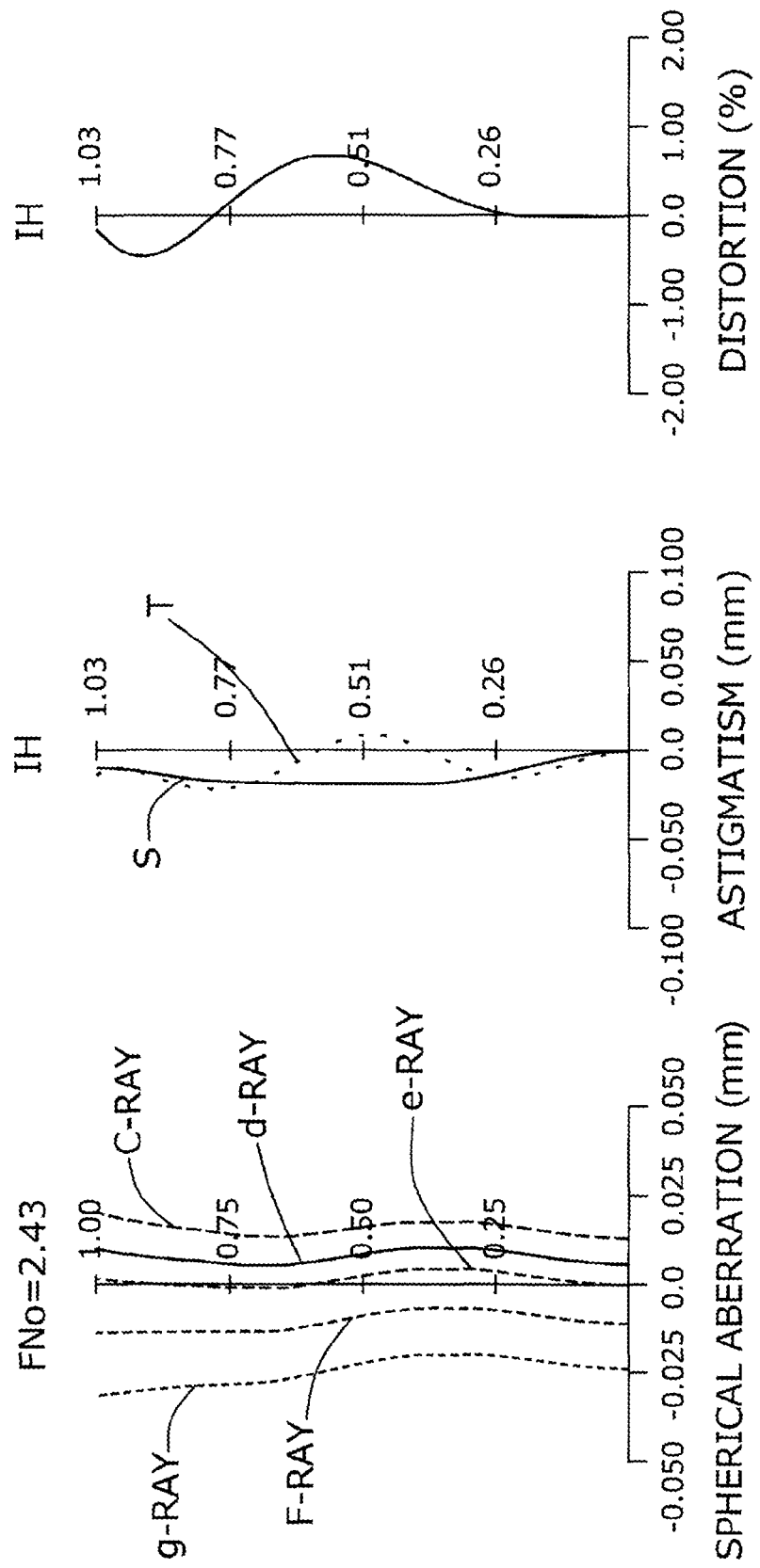
FIG. 8 is a view showing a spherical aberration, an astigmatism and a distortion of the image pickup lens according to Embodiment 4.
Figure 9:
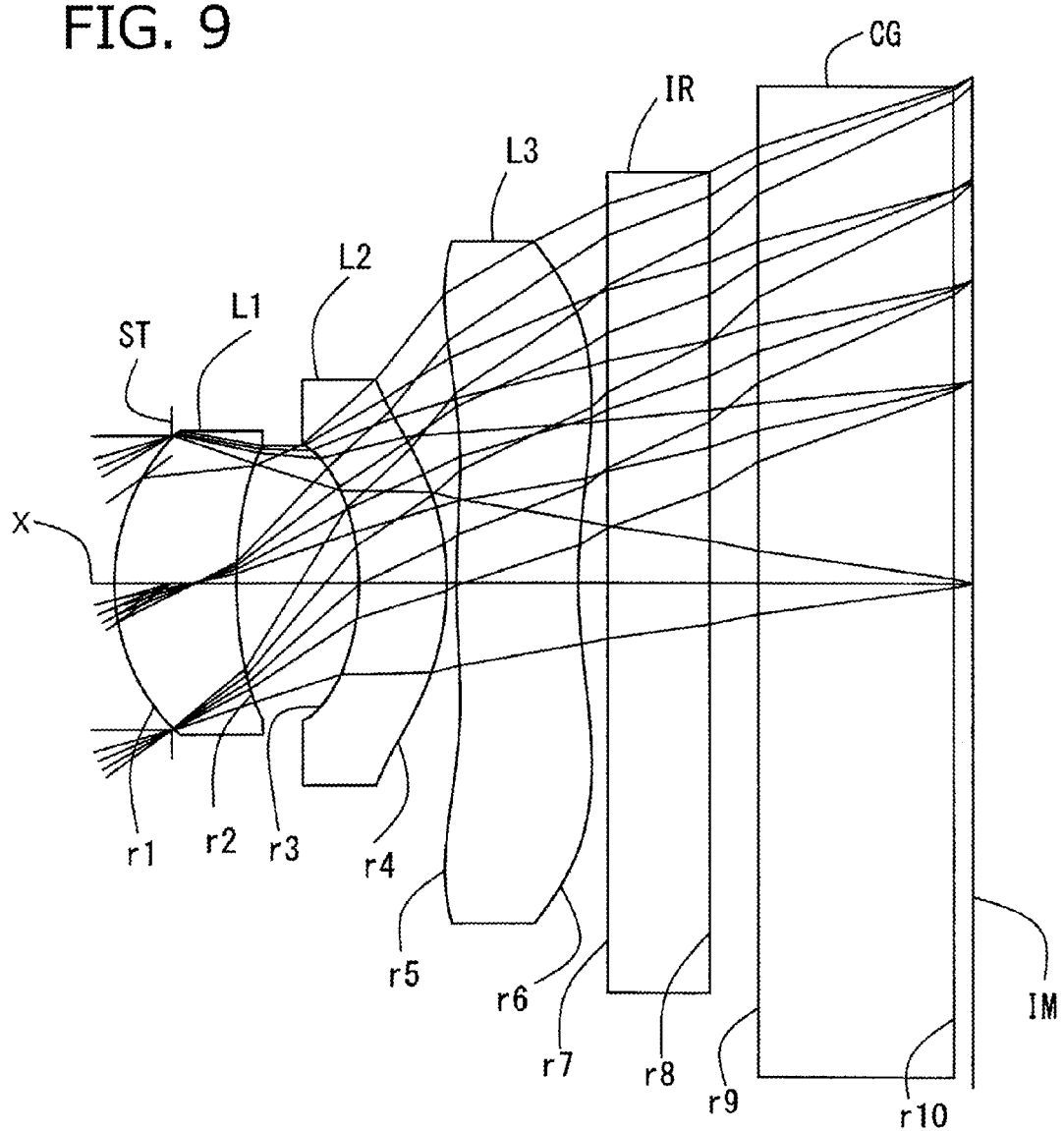
FIG. 9 is a view showing a general configuration of an image pickup lens according to Embodiment 5.

FIG. 8 shows a spherical aberration (mm), an astigmatism (mm), and a distortion (%) of the image pickup lens according to Embodiment 4. As shown in FIG. 8, it can be seen that the respective aberrations are satisfactorily corrected.

Further, the total track length TTL is as extremely short as 1.55 mm, the ratio thereof to the maximum image height IH (TTL/2IH) is 0.75, and the back focus is 0.60 mm, which means that an extremely thin and compact image pickup lens is realized while ensuring a sufficient back focus. Further, the F number is as bright as 2.43, and the half angle of field is approximately 35.7°, which means that a wide angle of field is realized.

Embodiment 5

Basic lens data will be shown in Table 5 below.

TABLE 5

Embodiment 5
Unit mm $f = 1.431$
$Fno = 2.41$
$\omega(°) = 35.70$
$IH = 1.028$

Surface Data

| Surface No. | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.1175 | | |
| 2* | 0.441 | 0.250 | 1.5438 | 55.57 |
| 3* | 1.003 | 0.250 | | |
| 4* | −0.511 | 0.180 | 1.5438 | 55.57 |
| 5* | −0.549 | 0.020 | | |
| 6* | 1.837 | 0.250 | 1.5438 | 55.57 |
| 7* | 1.090 | 0.060 | | |
| 8 | Infinity | 0.21 | 1.5168 | 64.20 |
| 9 | Infinity | 0.100 | | |
| 10 | Infinity | 0.400 | 1.5168 | 64.20 |
| 11 | Infinity | 0.040 | | |
| Image Plane | Infinity | | | |

Aspherical Surface Data

| | 2nd Surface | 3rd Surface | 4th Surface | 5th Surface | 6th Surface | 7th Surface |
|---|---|---|---|---|---|---|
| k | −1.055E+00 | 2.814E+00 | 2.229E+00 | −6.294E−01 | 2.164E+00 | −2.505E−01 |
| A4 | 1.575E+00 | 1.534E+00 | 3.384E+00 | −1.207E+00 | −3.365E+00 | −2.430E+00 |
| A6 | 1.829E+01 | −1.652E+01 | −1.696E+02 | 5.983E+00 | 1.083E+01 | 4.934E+00 |
| A8 | −1.389E+02 | 4.103E+02 | 4.759E+03 | −5.804E+01 | −1.753E+01 | −1.187E+01 |
| A10 | 1.152E+03 | −1.932E+03 | −6.053E+04 | 1.263E+03 | 2.580E+01 | 2.192E+01 |
| A12 | 0.000E+00 | 0.000E+00 | 3.197E+05 | −5.041E+03 | −4.064E+01 | −3.262E+01 |
| A14 | 0.000E+00 | 0.000E+00 | 0.000E+00 | 2.981E+01 | 3.204E+01 | 2.692E+01 |
| A16 | 0.000E+00 | 0.000E+00 | 0.000E+00 | 0.000E+00 | 0.000E+00 | 0.000E+00 |

Single Lens Data

| Lens | Start Plane | Focal Length | Effective Radius SD | Edge Thickness Te |
|---|---|---|---|---|
| 1 | 2 | 1.245 | 0.306 | 0.171 |
| 2 | 4 | 19.935 | 0.413 | 0.149 |
| 3 | 6 | −5.563 | 0.695 | 0.187 |

The image pickup lens according to Embodiment 5 satisfies all conditional expressions (1) through (13), as shown in Table 6. Further, the first lens, the second lens and the third lens are all formed of cycloolefin copolymer, which is a plastic material having high fluidity, so that the fabrication of an ultracompact lens can be realized.

Figure 10:
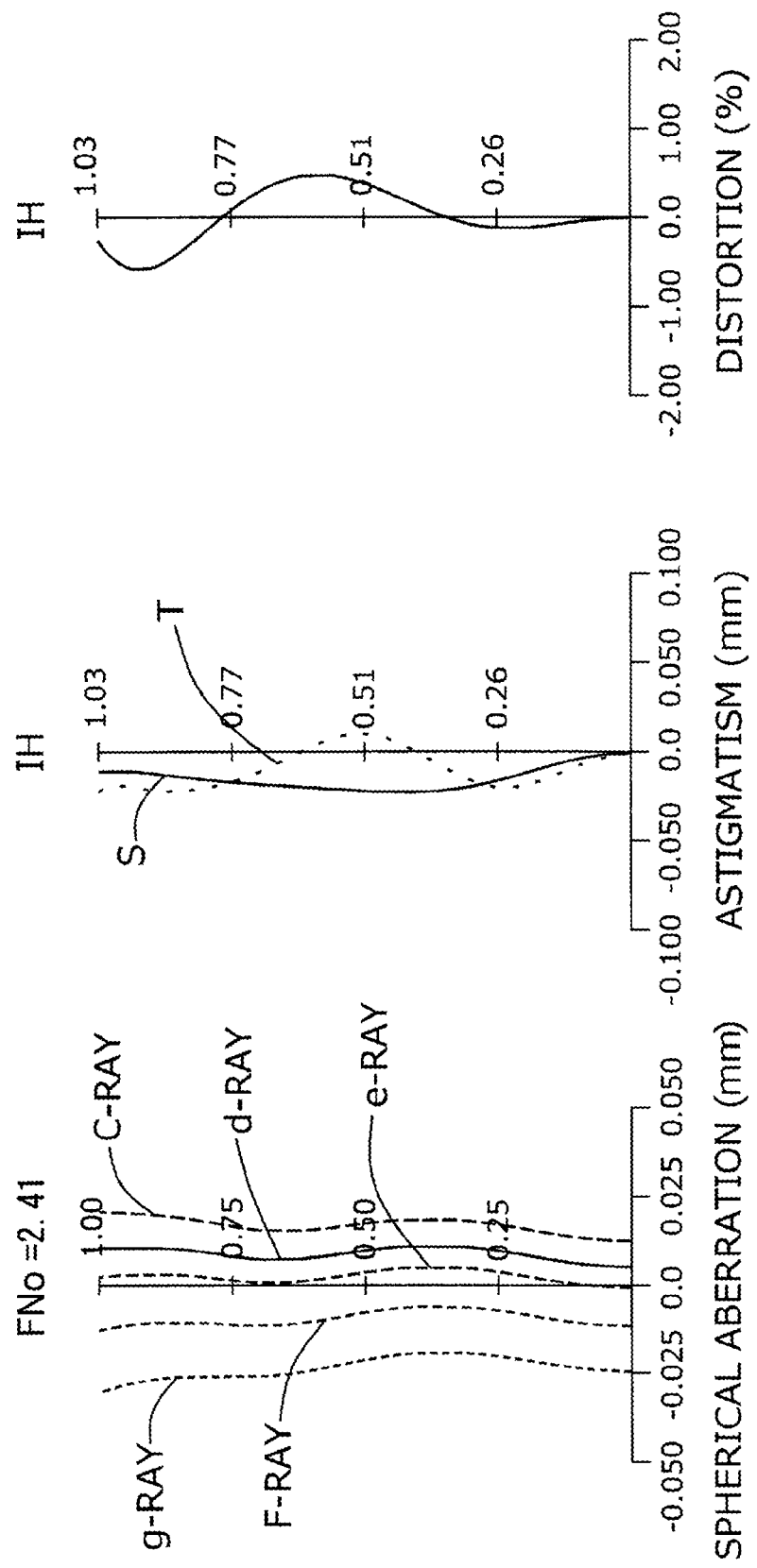
FIG. 10 is a view showing a spherical aberration, an astigmatism and a distortion of the image pickup lens according to Embodiment 5.
Figure 11:
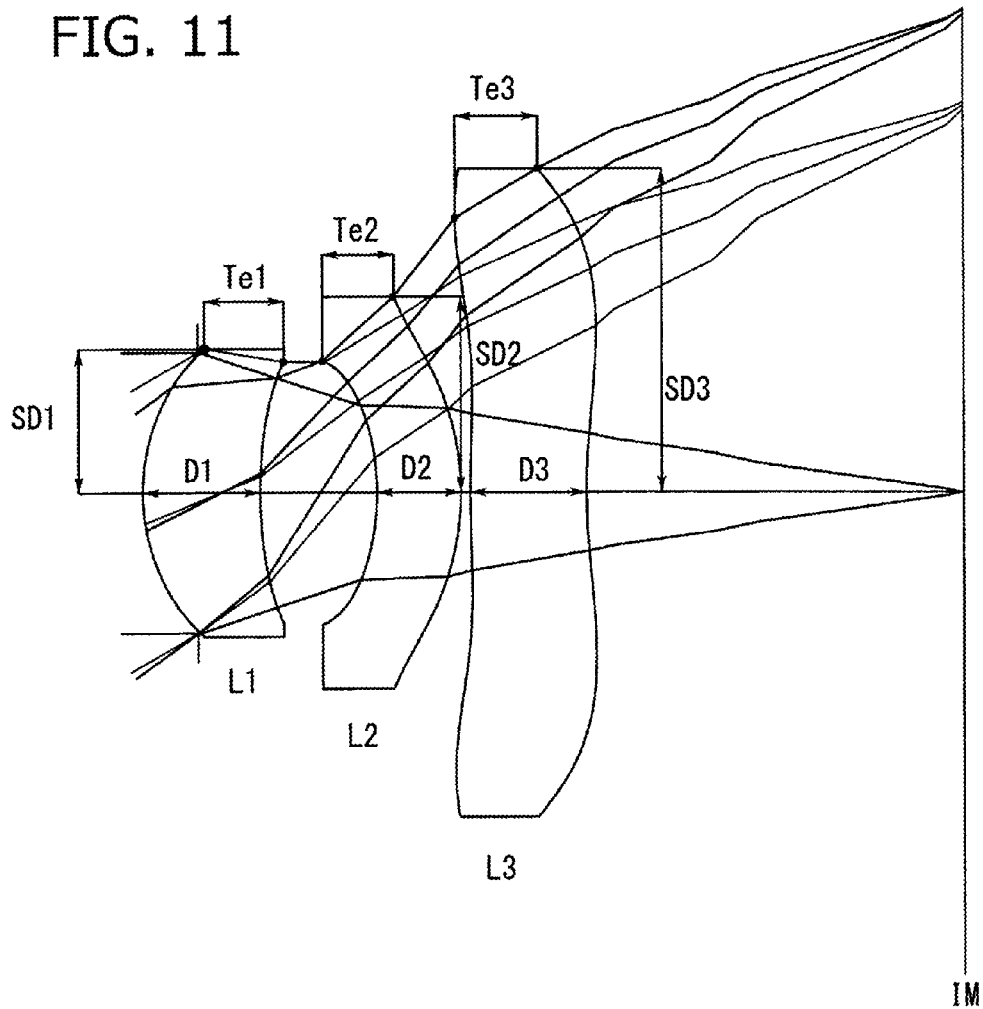
FIG. 11 is a view showing a lens thickness D, an edge thickness Te, and an effective radius SD of the respective lenses according to the present invention.

FIG. 10 shows a spherical aberration (mm), an astigmatism (mm), and a distortion (%) of the image pickup lens according to Embodiment 5. As shown in FIG. 10, it can be seen that the respective aberrations are satisfactorily corrected.

Further, the total track length TTL is as extremely short as 1.55 mm, the ratio thereof to the maximum image height IH (TTL/2IH) is 0.75, and the back focus is 0.60 mm, which means that an extremely thin and compact image pickup lens is realized while ensuring a sufficient back focus. Further, the F-value is as bright as 2.41, and the half angle of field is approximately 35.7°, which means that a wide angle of field is realized.

It can be seen that according to the image pickup lens of the embodiments of the present invention, the total track length TTL is 1.55 mm or smaller and the ratio of the total track length to the maximum image height IH (TTL/2IH) is 0.76 or smaller, so that an extremely thin and downsized image pickup lens is achieved. Further according to the present lens, various aberrations are corrected satisfactorily, the F-value is as bright as approximately 2.4, and the angle of field is approximately 72°, which means that an image having a relatively wide angle of field can be taken.

TABLE 6

| | | Embodiment 1 | Embodiment 2 | Embodiment 3 | Embodiment 4 | Embodiment 5 |
|---|---|---|---|---|---|---|
| Conditional Expression (1) TTL < 3.0 | | 1.549 | 1.549 | 1.549 | 1.549 | 1.548 |
| Conditional Expression (2) 0.80 < f1/f < 0.93 | | 0.868 | 0.866 | 0.873 | 0.870 | 0.870 |
| Conditional Expression (3) 0.35 < bf/TTL < 0.42 | | 0.387 | 0.387 | 0.387 | 0.387 | 0.386 |
| Conditional Expression (4) 0.70 < TTL/(2IH) < 0.85 | | 0.753 | 0.753 | 0.753 | 0.753 | 0.753 |
| Conditional Expression (5) 0.02 < L3Rsag/bf < 0.05 | | 0.035 | 0.038 | 0.039 | 0.048 | 0.047 |
| Conditional Expression (6) 0.16 < Di < 0.30 | L1 | 0.250 | 0.250 | 0.248 | 0.250 | 0.250 |
| | L2 | 0.180 | 0.180 | 0.187 | 0.180 | 0.180 |
| | L3 | 0.250 | 0.250 | 0.235 | 0.250 | 0.250 |
| Conditional Expression (7) 0.04 < (Di − Tei)/SDi < 0.30 | L1 | 0.246 | 0.260 | 0.241 | 0.252 | 0.259 |
| | L2 | 0.064 | 0.064 | 0.086 | 0.047 | 0.074 |
| | L3 | 0.110 | 0.107 | 0.087 | 0.069 | 0.091 |
| Conditional Expression (8) 0.41 < (IH/f)/TTL < 0.51 | | 0.464 | 0.463 | 0.464 | 0.464 | 0.464 |
| Conditional Expression (9) −0.20 < f1/f23 <− 0.15 | | −0.179 | −0.188 | −0.171 | −0.183 | −0.184 |
| Conditional Expression (10) −5.0 < f3/f <− 2.0 | | −4.046 | −3.874 | −2.970 | −2.620 | −3.887 |
| Conditional Expression (11) 1.6 < r5/r6 < 2.2 | | 1.776 | 1.778 | 2.166 | 2.168 | 1.685 |
| Conditional Expression (12) 0.15 < T1/f < 0.20 | | 0.175 | 0.174 | 0.174 | 0.175 | 0.175 |
| Conditional Expression (13) −3.0 < (r1 + r2)/(r1 − r2) <− 2.0 | | −2.566 | −2.566 | −2.575 | −2.561 | −2.569 |

INDUSTRIAL APPLICABILITY

The image pickup lens having a three-lens configuration according to the respective embodiments of the present invention can be applied to optical systems built into imaging devices adopting small and thin solid-state imaging elements mounted on portable terminals such as cellular phones and smartphones, motion sensors for home-use game machines, PDAs (Personal Digital Assistants) and so on, according to which an image pickup lens having a sufficient back focus and realizing extreme thinness and downsizing can be provided.

The effects of the present invention are as follows.

The present invention enables to realize an extremely small and thin image pickup lens where various aberrations are corrected favorably and sufficient back focus is ensured. The F-value of the present lens is as bright as approximately 2.4, so that the present invention enables to provide an image pickup lens which is bright and can correspond to a wide angle of field.

What is claimed is:

1. An image pickup lens for a solid-state imaging element, comprising, in order from an object side to an image side, an aperture stop, a first lens of a meniscus shape having a positive refractive power with a convex surface facing the object side, a second lens having a positive refractive power with a concave surface facing the object side, and a third lens having a negative refractive power with a convex surface facing the object side near an optical axis, wherein the third lens is designed so that both surfaces thereof are aspheric, having at least one pole-change point on the object side surface and the image side surface, and wherein following conditional expressions (1) through (4) are satisfied:

$$TTL<3.0 \tag{1}$$

$$0.80<f1/f<0.93 \tag{2}$$

$$0.35<bf/TTL<0.42 \tag{3}$$

$$0.70<TTL/(2IH)<0.85 \tag{4}$$

where TTL represents a length along the optical axis from the surface closest to the object side to an image plane when filters and the like arranged between the third lens and the imaging elements are removed (air-converted distance), f represents a focal length of an overall optical system of the image pickup lens, f1 represents a focal length of the first lens, bf represents a length along the optical axis from the image-side surface of the third lens to the image plane when filters and the like arranged between the third lens and the imaging elements are removed (back focus (air-converted distance)), and IH represents a maximum image height.

2. The image pickup lens according to claim 1, wherein the object side surface of the third lens has two pole-change points.

3. The image pickup lens according to claim 1, wherein following conditional expressions (6) and (7) are satisfied:

$$0.16<Di<0.30 \tag{6}$$

$$0.04<(Di-Tei)/SDi<0.30 \tag{7}$$

where Di represents a center thickness of i-th lens (i=1 to 3), Tei represents an edge thickness of i-th lens (i=1 to 3), and SDi represents an effective radius of i-th lens (i=1 to 3).

4. The image pickup lens according to claim 1, wherein a following conditional expression (9) is satisfied:

$$-0.20<f1/f23<-0.15 \tag{9}$$

where f1 represents a focal length of the first lens, and f23 represents a composite focal length of the second lens and the third lens.

5. The image pickup lens according to claim 1, wherein a following conditional expression (12) is satisfied:

$$0.15 < T1/f < 0.20 \tag{12}$$

where f represents a focal length of the overall optical system of the image pickup lens, and T1 represents an air distance on the optical axis between the first lens and the second lens.

6. The image pickup lens according to claim 1, wherein a following conditional expression (13) is satisfied:

$$-3.0 < (r1+r2)/(r1-r2) < -2.0 \tag{13}$$

where r1 represents a curvature radius of the object side surface of the first lens, and r2 represents a curvature radius of the image side surface of the first lens.

7. The image pickup lens according to claim 1, wherein a following conditional expression (5) is satisfied:

$$0.02 < L3Rsag/bf < 0.05 \tag{5}$$

where bf represents a length along the optical axis from the image-side surface of the third lens to the image plane when filters and the like arranged between the third lens and the imaging elements are removed (back focus (air-converted distance)), and L3Rsag represents a maximum sag at the pole-change point on the image-side surface of the third lens.

8. The image pickup lens according to claim 7, wherein following conditional expressions (10) and (11) are satisfied:

$$-5.0 < f3/f < -2.0 \tag{10}$$

$$1.6 < r5/r6 < 2.2 \tag{11}$$

where f represents a focal length of the overall optical system of the image pickup lens, f3 represents a focal length of the third lens, r5 represents a curvature radius of the object side surface of the third lens, and r6 represents a curvature radius of the image side surface of the third lens.

9. The image pickup lens according to claim 7, wherein the object side surface of the third lens has two pole-change points.

* * * * *